US009153802B2

(12) United States Patent
Andersen et al.

(10) Patent No.: US 9,153,802 B2
(45) Date of Patent: Oct. 6, 2015

(54) SECONDARY BATTERY

(75) Inventors: Glenn W. Andersen, Hartford, WI (US); Edward L. Hams, Oak Creek, WI (US); Edward C. Frelka, Muskego, WI (US); Moises Casanova, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 116 days.

(21) Appl. No.: 13/581,096

(22) PCT Filed: Feb. 25, 2011
(Under 37 CFR 1.47)

(86) PCT No.: PCT/US2011/026295
§ 371 (c)(1),
(2), (4) Date: Mar. 11, 2013

(87) PCT Pub. No.: WO2011/106682
PCT Pub. Date: Sep. 1, 2011

(65) Prior Publication Data
US 2014/0072863 A1    Mar. 13, 2014

Related U.S. Application Data

(60) Provisional application No. 61/308,159, filed on Feb. 25, 2010.

(51) Int. Cl.
*H01M 10/06* (2006.01)
*H01M 2/04* (2006.01)
(Continued)

(52) U.S. Cl.
CPC ............. *H01M 2/043* (2013.01); *B60L 3/0046* (2013.01); *B60L 11/1877* (2013.01);
(Continued)

(58) Field of Classification Search
CPC ....................................................... H01M 10/06
USPC .......................................................... 429/175
See application file for complete search history.

(56) References Cited

U.S. PATENT DOCUMENTS 1,687,262 A    10/1928  Vaughn
4,011,364 A  *  3/1977  Schenk, Jr. ...................... 429/1
(Continued)

FOREIGN PATENT DOCUMENTS

| CN | 201352568 Y | 11/2009 |
|---|---|---|
| JP | 61198552 A | 9/1986 |
| WO | WO 03/077349 A1 | 9/2003 |

OTHER PUBLICATIONS

International Preliminary Report on Patentability and Written Opinion of International Searching Authority dated Sep. 7, 2012 for International Application No. PCT/US2011/026295.
(Continued)

*Primary Examiner* — Ula C. Ruddock
*Assistant Examiner* — Jacob Marks
(74) *Attorney, Agent, or Firm* — Boardman & Clark LLP

(57) ABSTRACT

A battery cover adapted for correct assembly on a battery is disclosed. The battery cover has an outer surface including a longitudinal centerline and a transverse centerline perpendicular to the longitudinal centerline. A first bushing is provided having an aperture with a first dimension that mates with a corresponding first dimension of a positive cast-on-strap post. A second bushing is also provided having a second dimension that mates with a corresponding second dimension of a negative cast-on-strap post. The first bushing and second bushing are carried by the battery cover and positioned on opposite sides of the longitudinal and transverse centerlines. A secondary battery is also provided.

17 Claims, 10 Drawing Sheets

(51) Int. Cl.
*H01M 2/30* (2006.01)
*H01M 10/12* (2006.01)
*B60L 3/00* (2006.01)
*B60L 11/18* (2006.01)

(52) U.S. Cl.
CPC ........ *B60L 11/1879* (2013.01); *H01M 2/0434* (2013.01); *H01M 2/307* (2013.01); *H01M 10/12* (2013.01); *B60L 2200/18* (2013.01); *B60L 2200/22* (2013.01); *B60L 2200/26* (2013.01); *B60L 2200/32* (2013.01); *B60L 2200/40* (2013.01); *Y02E 60/126* (2013.01); *Y02T 10/705* (2013.01); *Y02T 10/7005* (2013.01); *Y02T 10/7016* (2013.01); *Y10T 29/49108* (2015.01)

(56) References Cited

U.S. PATENT DOCUMENTS

| | | |
|---|---|---|
| 4,030,796 A | 6/1977 | Patzer |
| 4,945,749 A | 8/1990 | Walker et al. |
| 2001/0049053 A1 | 12/2001 | Hasegawa et al. |
| 2001/0053636 A1* | 12/2001 | Tamai et al. ............ 439/677 |
| 2003/0077483 A1 | 4/2003 | Streuer et al. |
| 2006/0177734 A1* | 8/2006 | Yao ........................ 429/160 |

OTHER PUBLICATIONS

International Search Report in International Application No. PCT/US2011/026295.
Written Opinion of the International Searching Authority in International Application No. PCT/US2011/026295.

* cited by examiner

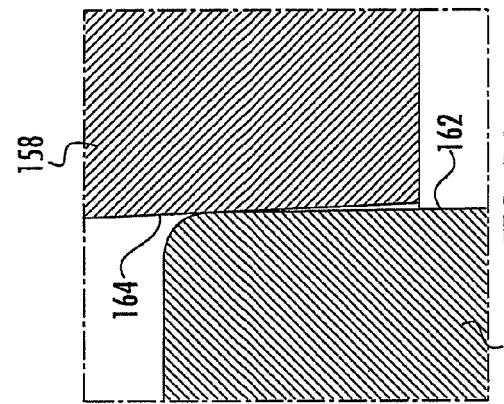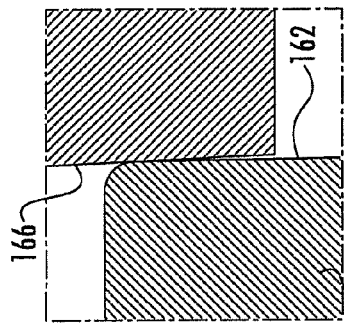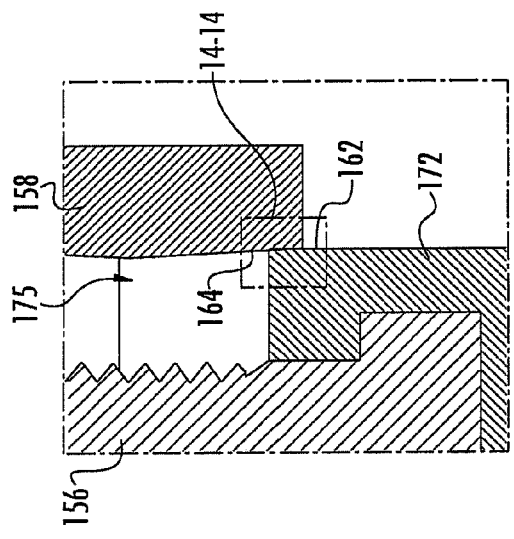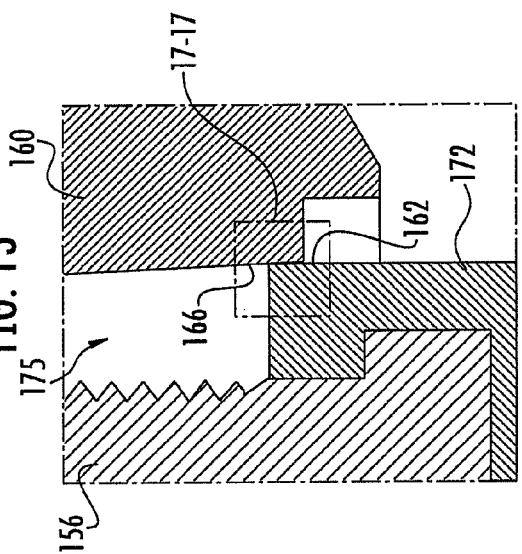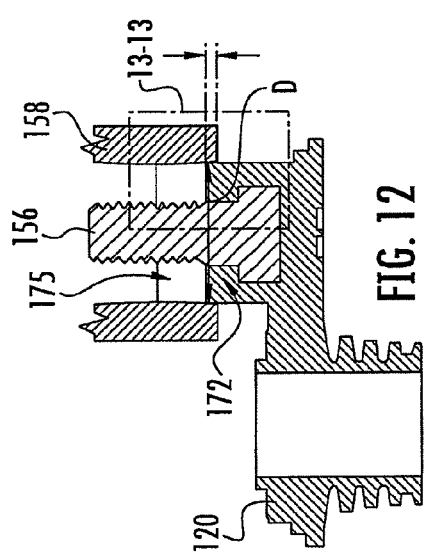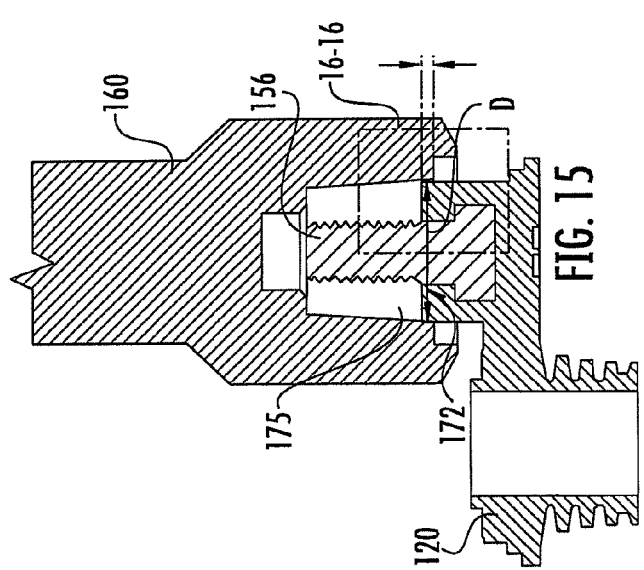

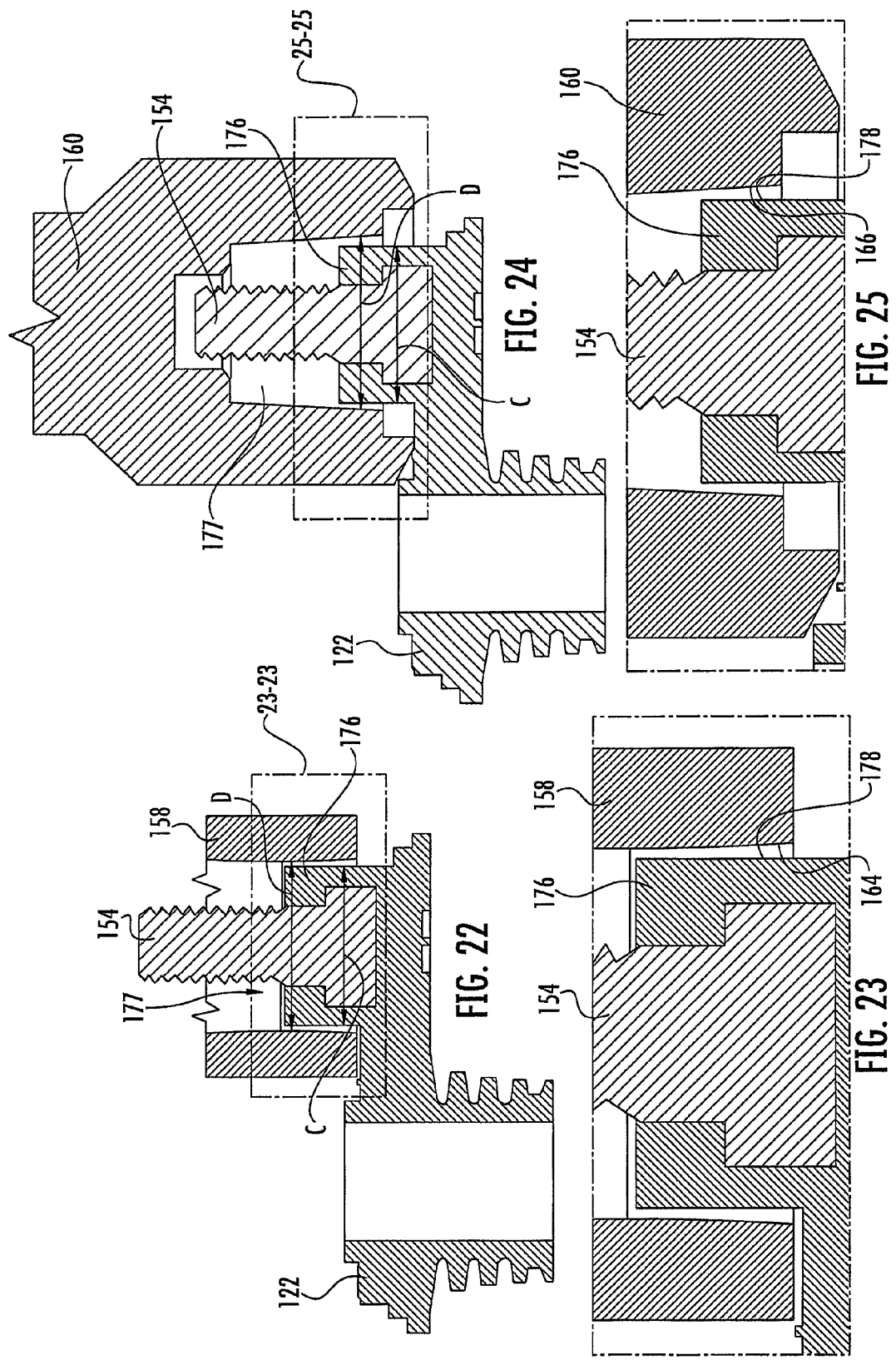

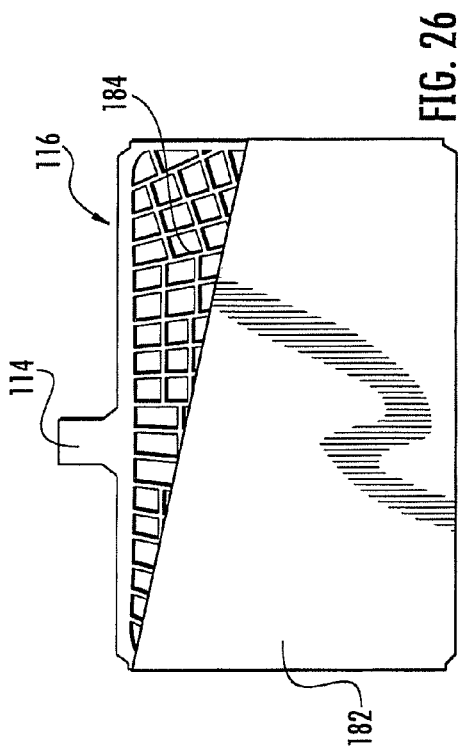
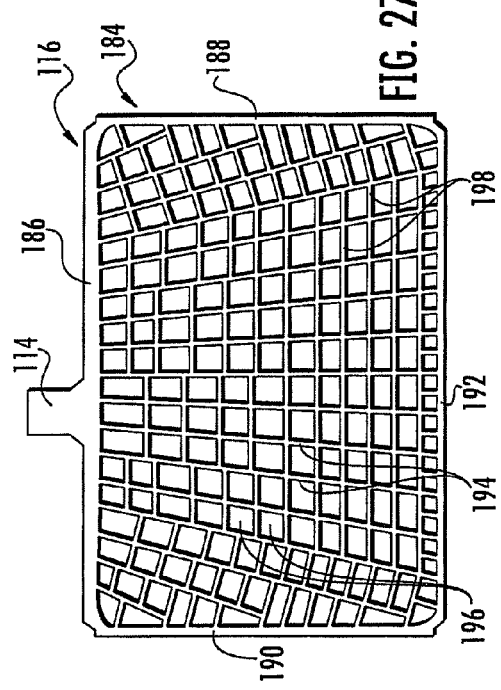
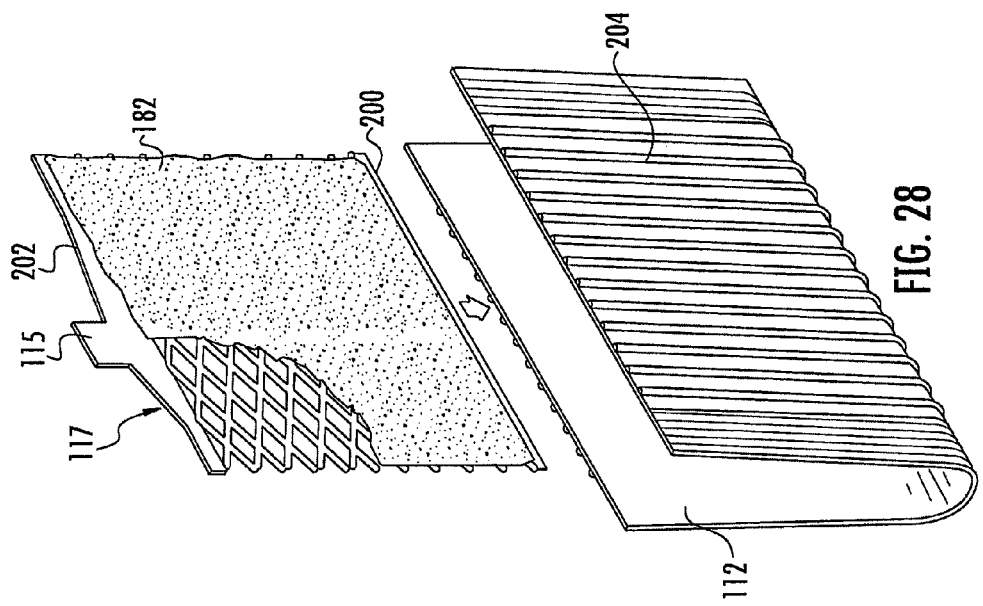

SECONDARY BATTERY

CROSS-REFERENCE TO RELATED APPLICATIONS

This application claims the benefit of U.S. Provisional Patent Application Ser. No. 61/308,159 entitled "Secondary Battery" which was filed Feb. 25, 2010, and PCT Patent Application No. PCT/US2011/026295 filed on Feb. 25, 2011, the entire contents of which are hereby incorporated by reference herein in their entirety.

FIELD

The present inventions relate to the field of batteries (e.g., lead-acid batteries including batteries for vehicle starting, lighting and ignition applications; marine batteries; commercial batteries; industrial batteries; batteries for use with golf cars and carts, hybrid-electric vehicles, microhybrid vehicles, etc.). The present inventions more specifically relate to battery terminals, bushings, terminal posts, and/or battery covers.

BACKGROUND

It is known to provide a terminal for an external electrical contact on a secondary battery (e.g., an electrical contact on the outside of a battery housing). In some configurations, a terminal post is provided into and/or through a bushing molded into a cover of the battery housing to help couple the terminal to internal components of the battery. A bushing may also be inserted in a cover and extend above the battery cover. It is also known to provide a bushing and/or cover that may be used to help seal the internal components of the battery from the environment.

Unfortunately, current terminals, terminal posts, bushings and/or battery covers are prone to be improperly assembled on top of the battery housing and internal components. As a result, batteries can be damaged during assembly. In addition, even if properly assembled, many current battery terminals are easily improperly connected to formation or charging cables which are provided to activate or charge the assembled battery. Improper connection of the formation cables can also damage the battery.

SUMMARY

Accordingly, a battery cover adapted for correct assembly on a battery is disclosed. The battery cover has an outer surface including a longitudinal centerline and a transverse centerline perpendicular to the longitudinal centerline. A first bushing is provided having an aperture with a first dimension that mates with a corresponding first dimension of a positive cast-on-strap post. A second bushing is also provided having a second dimension that mates with a corresponding second dimension of a negative cast-on-strap post. The first bushing and second bushing are carried by the battery cover and positioned on opposite sides of the longitudinal and transverse centerlines.

A secondary battery is disclosed. The secondary battery includes a battery cover having a first bushing and a second bushing. The first bushing and second bushing are positioned on opposite sides of an intersecting longitudinal centerline and transverse centerline. The first and second bushings have differing dimensions which match respective positive and negative cast-on-strap posts.

BRIEF DESCRIPTION OF THE DRAWINGS

Various examples of embodiments of the systems and methods according to the present disclosure will be described in detail, with reference to the following figures, wherein:

FIG. 12 is a cross-sectional view of a portion of a positive formation or charging connector provided on a positive bushing according to one or more examples of embodiments;

FIG. 13 is a cross-sectional view of the interface between the positive bushing and positive formation connector of FIG. 12, taken from line 13-13 of FIG. 12;

FIG. 14 is a cross-sectional view of the interface between the positive bushing and positive formation connector of FIG. 12, taken from line 14-14 of FIG. 13;

FIG. 15 is a cross-sectional view of a portion of a positive universal formation or charging connector provided on a positive bushing according to one or more examples of embodiments;

FIG. 16 is a cross-sectional view of the interface between the positive bushing and positive universal formation connector of FIG. 15, taken from line 16-16 of FIG. 15;

FIG. 17 is a cross-sectional view of the interface between the positive bushing and positive universal formation connector of FIG. 15, taken from line 17-17 of FIG. 16;

FIG. 22 is a cross-sectional view of a portion of a positive formation or charging connector provided on a negative bushing according to one or more examples of embodiments;

FIG. 23 is a cross-sectional view of the interface between the negative bushing and positive formation connector of FIG. 22, taken from line 23-23 of FIG. 22;

FIG. 24 is a cross-sectional view of a portion of a positive universal formation or charging connector provided on a negative bushing according to one or more examples of embodiments;

FIG. 25 is a cross-sectional view of the interface between the negative bushing and positive universal formation connector of FIG. 24, taken from line 25-25 of FIG. 24;

FIG. 26 is a front elevation view of a positive grid and paste material according to one or more examples of embodiments, with a portion of the paste material removed to reveal the grid;

FIG. 27 is a front elevation view of a positive grid according to one or more examples of embodiments;

FIG. 28 is a side perspective view of a negative grid with paste material and a separator according to one or more examples of embodiments, with a portion of the paste material removed to reveal the grid; and It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
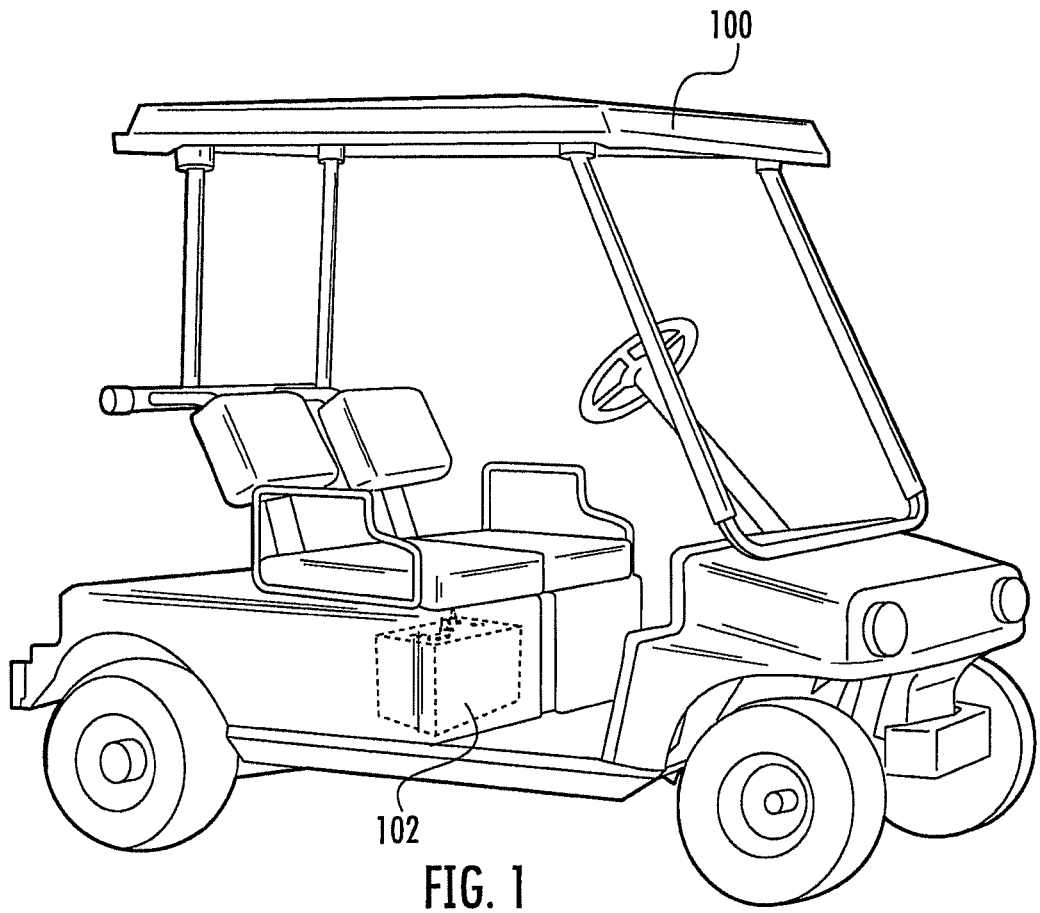
FIG. 1 is an isometric view of a vehicle including a battery according to one or more examples of embodiments.

Referring to FIG. 1, a vehicle 100 is shown that includes a battery 102 according to one or more examples of embodiments. While the vehicle 100 is shown as an automobile, according to various alternative embodiments, the vehicle 100 may comprise any variety of types of vehicles including, among others, golf carts or golf cars, motorcycles, buses, recreational vehicles, marine vehicles and boats, lawn and garden vehicles, and the like. According to one or more examples of embodiments, the vehicle 100 uses an internal combustion engine, or a combination of internal combustion engine and battery, for locomotive purposes.

The battery 102 shown in FIG. 1 is configured to provide at least a portion of the power required to start or operate the vehicle 100 and/or various vehicle systems (e.g., starting, lighting and ignition systems). Further, it should be understood that the battery 102 may be utilized in a variety of applications not involving a vehicle 100, and all such applications are intended to be within the scope of the present disclosure.

The battery 102 shown in FIG. 1 may include any type of secondary battery (e.g., rechargeable battery). According to one or more examples of embodiments, the battery 102 is a lead-acid storage battery. Various embodiments of lead-acid storage batteries may be either sealed (e.g., non-maintenance) or unsealed (e.g., wet). According to one or more examples of embodiments, the lead-acid storage battery 102 is an unsealed lead-acid battery and periodically requires the addition of electrolyte and/or water to maintain a desired volume and/or concentration of either or both.

Figure 2:
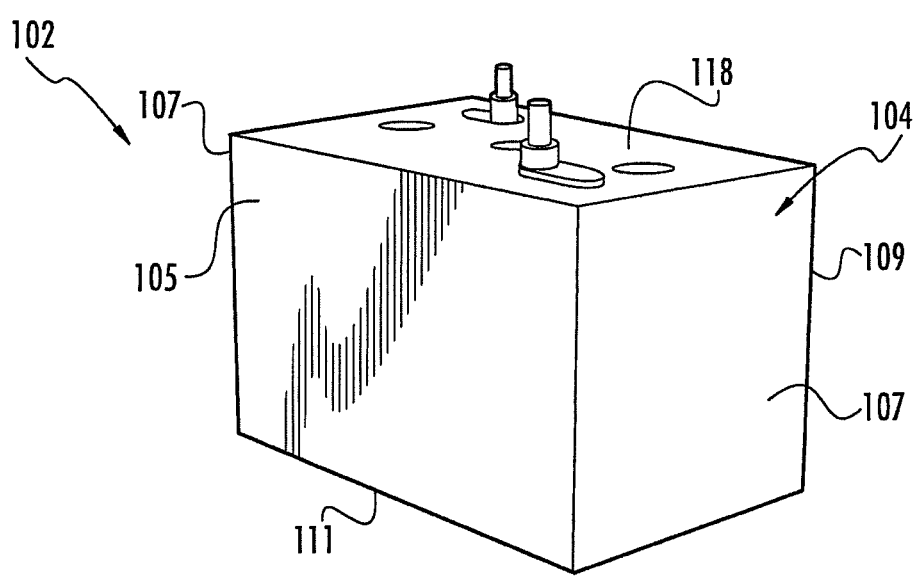
FIG. 2 is a perspective view of a battery according to one or more examples of embodiments.
Figure 3:
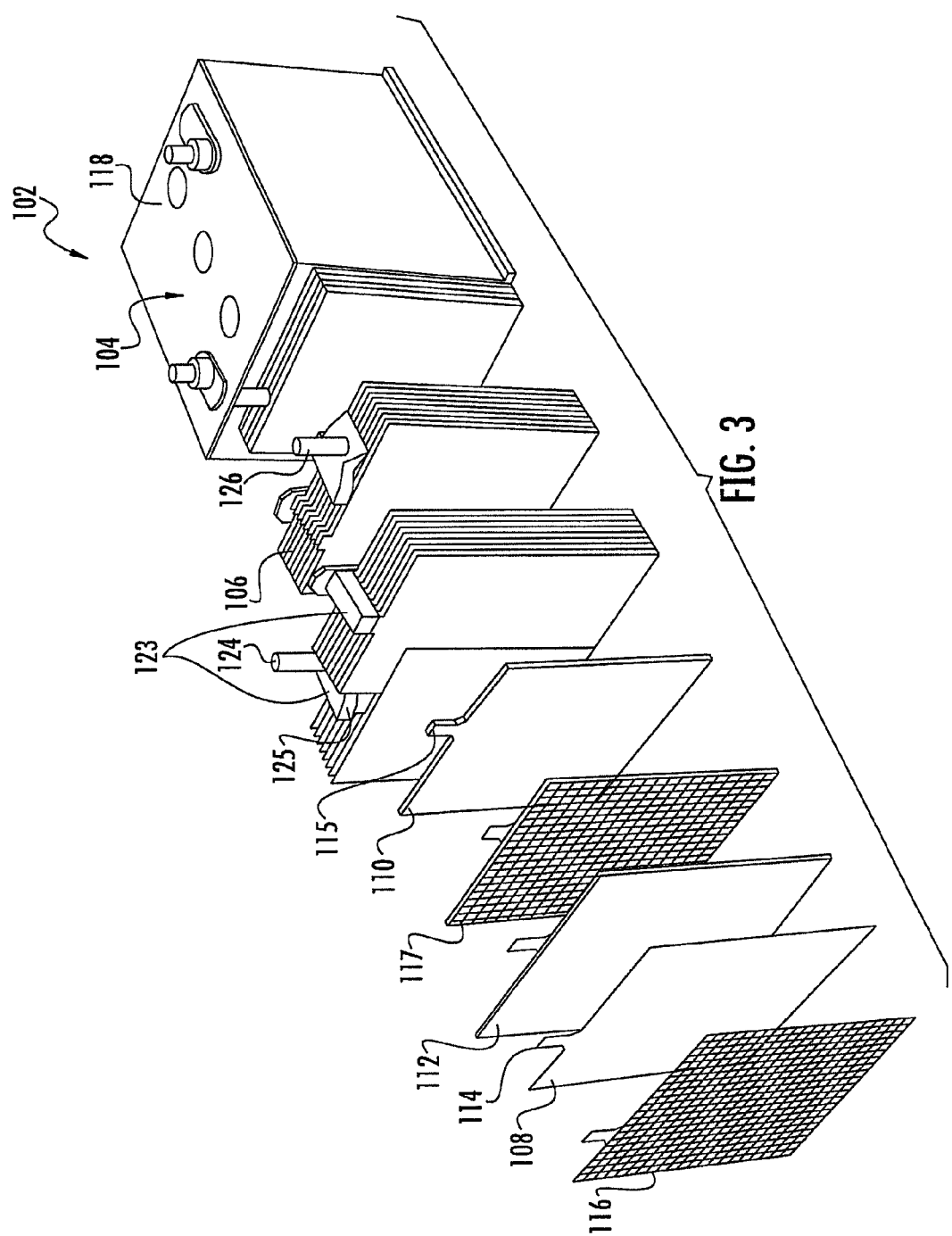
FIG. 3 is an exploded perspective view of a portion of the battery shown in FIG. 2.

A lead-acid storage battery 102 according to one or more examples of embodiments is illustrated in FIGS. 2-3. A lead-acid storage battery 102 includes a plurality of plate blocks or sets 106 connected in series according to the capacity of the lead storage battery 102. The plate blocks 106 are accommodated in a battery container or housing 104 together with electrolyte, which is most commonly aqueous sulfuric acid.

In various embodiments, the battery 102 includes a compartment having a front wall 105, end walls 107, a rear wall 109 and a bottom wall 111. The battery housing 104 includes a box-like base or container and is made of a moldable resin. As indicated, in various embodiments, the lead-acid storage battery 102 includes several cell elements which are provided in separate compartments of the container or housing 104 containing electrolyte. For example, two cell partitions or dividers are provided between the end walls, resulting in the formation of three compartments, as typically would be present in a six-volt automotive battery. A plate block 106 is located in each compartment. Each plate block may include one or more positive plates 108 and negative plates 110, each having at least one lug 114, and separator material 112 placed between each positive plate 108 and negative plate 110. It will be obvious to those skilled in the art after reading this specification that the size and number of the individual grids 116, the size and number of plates 108, 110 in any particular stack, and the number of stacks used to construct the battery may vary widely depending upon the desired end use.

A cover 118 (as shown in FIGS. 2-7) is provided for the housing 104, and in various embodiments, the cover 118 includes bushings 120 that allow a terminal post and/or a portion of a cast-on-strap to pass into and/or through the cover 118. In various embodiments, the cover 118 may also include fill tubes to allow electrolyte to be added to the cells and to permit servicing. To prevent undesirable spillage of electrolyte from the fill tubes, and to permit exhausting of gases generated during the electrochemical reaction, a battery 102 may also include one or more filler hole caps and/or vent cap assemblies.

Figure 4:
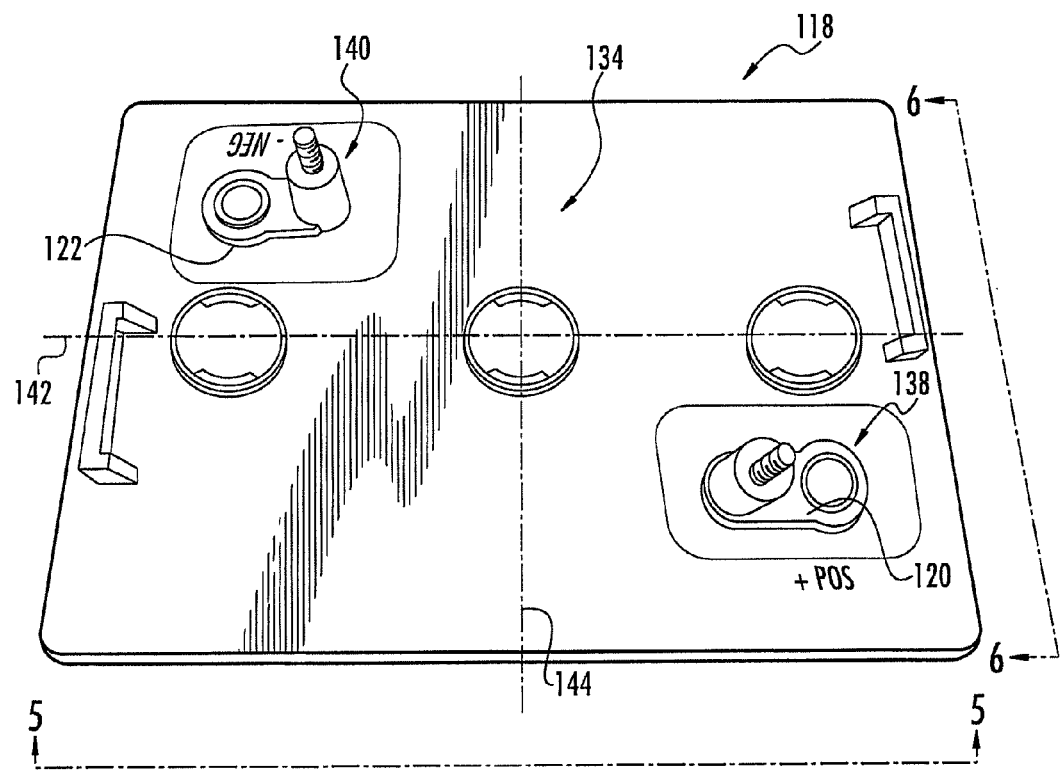
FIG. 4 is a perspective top view of a battery cover according to one or more examples of embodiments.
Figure 7:
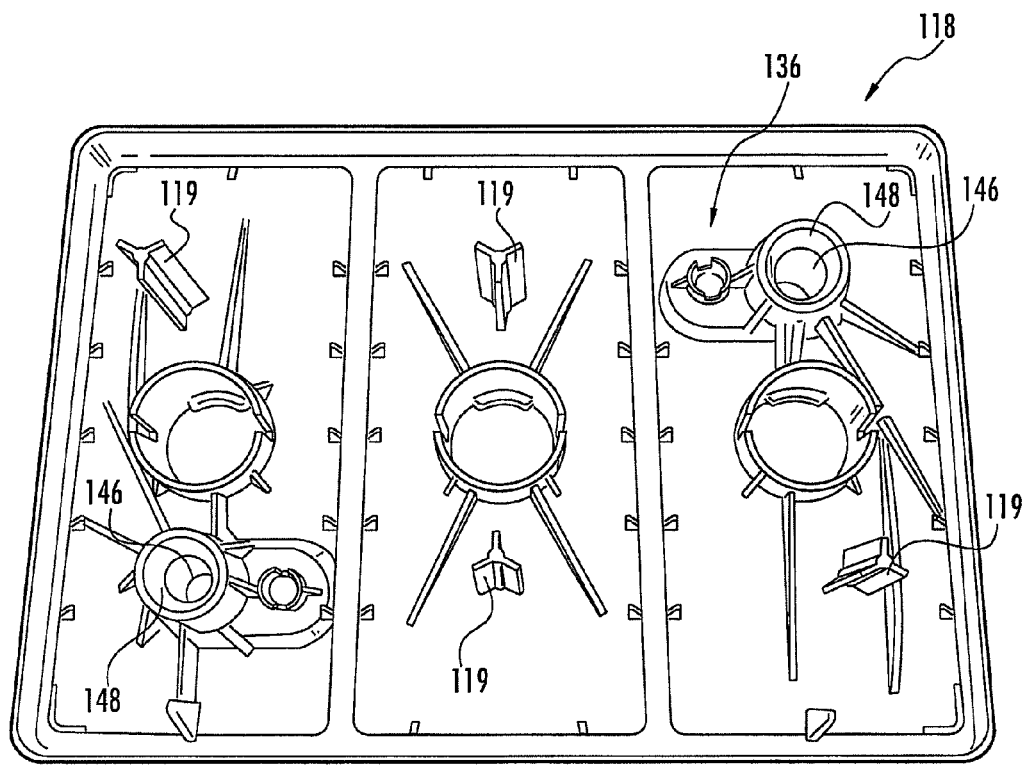
FIG. 7 is a bottom perspective view of the battery cover shown in FIG. 4.

As seen in FIGS. 4-7, the battery cover 118 has an outer surface 134, shown in FIG. 4, and an inner surface 136, shown in FIG. 7. The inner surface 136 of the cover 118 includes projections 119 for engaging the container portion 104 of the battery 102. In addition, as can be seen in FIG. 7 the cover 118 has a receptor 146 molded therein for each bushing 120 to be inserted into the cover 118. The receptor 146 may include an inwardly tapered surface 148 which assists in guiding the cast-on-strap post 124 or 126 into the bushing 122 or 120.

Referring to FIGS. 2-4, battery terminals 138, 140 extend from the outer surface 134 of the cover 118. One positive terminal 138 and one negative terminal 140 may be found on or about the cover 118 or front 105 of the battery 102. Such terminals 138, 140 are typically coupled to bushings 120, 122, portions of which may extend into and/or through the cover 118 and/or the front 105 of the battery housing 104, depending upon the battery design. In various embodiments, the battery may also include terminal posts that extend into or through a terminal post seal assembly and/or the bushings. It will be recognized that a variety of terminal, bushing and terminal post arrangements are possible, including top, side, corner or other terminal configurations known in the art within the parameters and scope of the invention described herein. As can be seen by reference to the Figures, the battery terminals 138 and 140 spaced part along the length and the width of the battery outer surface 134. To this end, the battery terminals 138 and 140 are spaced apart on the cover 118 along, or on opposite sides of, both the longitudinal center line 142 and the intersecting transverse center line 144 of the cover 118. The specific arrangement on opposite sides of the centerline provides a specific alignment of the positive terminal and the negative terminal with the respective active battery components within the battery container 104.

In various embodiments, the battery 102 also includes a conventional cast-on-strap 123 which includes a rectangular, elongated body portion of a length sufficient to electrically couple each lug in a plate set 106 and an upwardly extending member having a rounded top. According to various embodiments, the cast-on strap 123 includes a body portion 125 coupling the respective lugs 114, 115 in the compartments and a terminal post 124, 126 (negative and positive) formed therewith. The cast-on-strap in one or more examples of embodiments includes a body portion coupling respective lugs 114, 115 in the end compartments and a post formed therewith that may protrude through the cover 118. In one or more examples of embodiments, posts also may extend through terminal post seal assembly (not shown) and/or the bushing 120 to help prevent leakage of acid.

Figure 5:
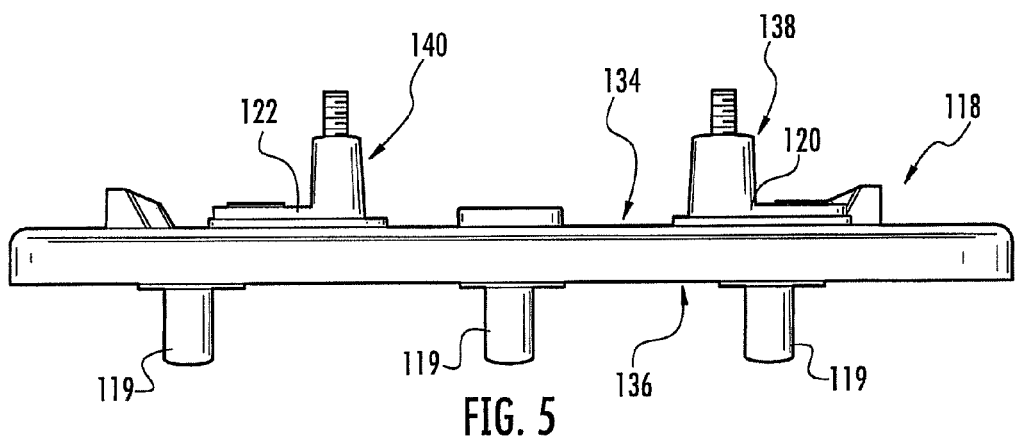
FIG. 5 is a side elevation view of the battery cover shown in FIG. 4, taken along line 5-5 of FIG. 4.
Figure 6:
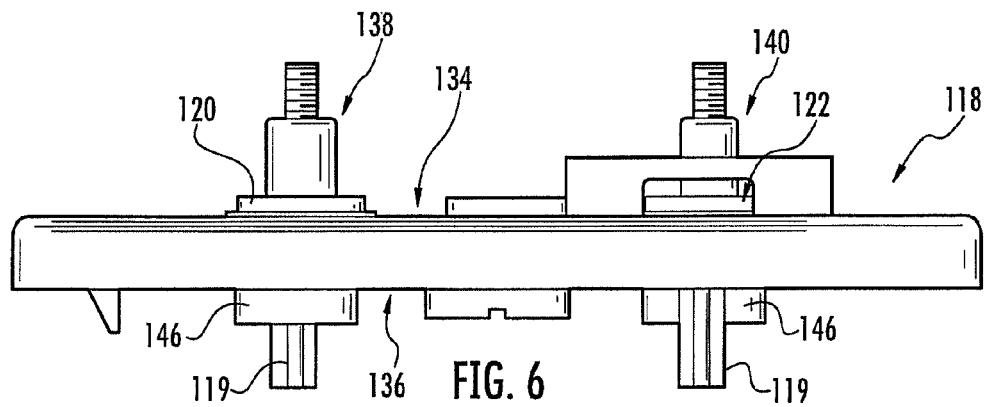
FIG. 6 is a side elevation view of the battery cover shown in FIG. 4, taken along line 6-6 of FIG. 4.

In various embodiments, and as shown in FIGS. 2-3, the battery 102 includes a cover 118 with at least a first bushing 120 and a second bushing 122. As shown in FIGS. 4-5, in various embodiments, the first bushing 120 and second bushing 122 have or include a portion with different relative dimensions, sizes and/or shapes. For example, as shown in FIGS. 4-5, the second bushing 122 defines or includes an aperture 128 having a first inside dimension, or width, or shape or diameter A (or another inside dimension) and the first bushing 120 defines or includes an aperture 130 having a second inside dimension, or width, or shape, or diameter B (or another inside dimension). For purposes of illustration and in one or more examples of embodiments, diameter A is less than or smaller than diameter B, but the converse arrangement is also acceptable. While "diameter" is specifically described herein for purposes of example, any suitable width, shape, or geometric configuration or dimension that accomplishes the purposes provided may be acceptable.

The embodiments disclosed herein are preferably for use with S-type bushings and UTL-type bushings. In particular, as illustrated in FIGS. 8-25 the invention is illustrated in associated with UTL bushings. However, corresponding features would also be applicable to the S-type and other type bushings.

Figure 8:
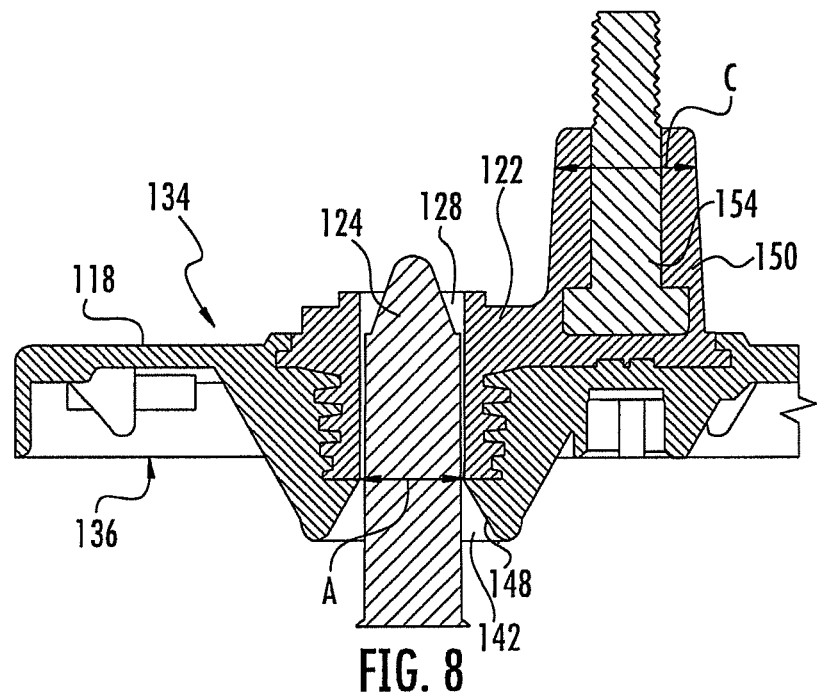
FIG. 8 is a cut-away cross-sectional view of a first bushing in the cover shown in FIG. 4 with a first terminal post or negative bushing and negative cast-on strap post provided therein according to one or more examples of embodiments.
Figure 9:
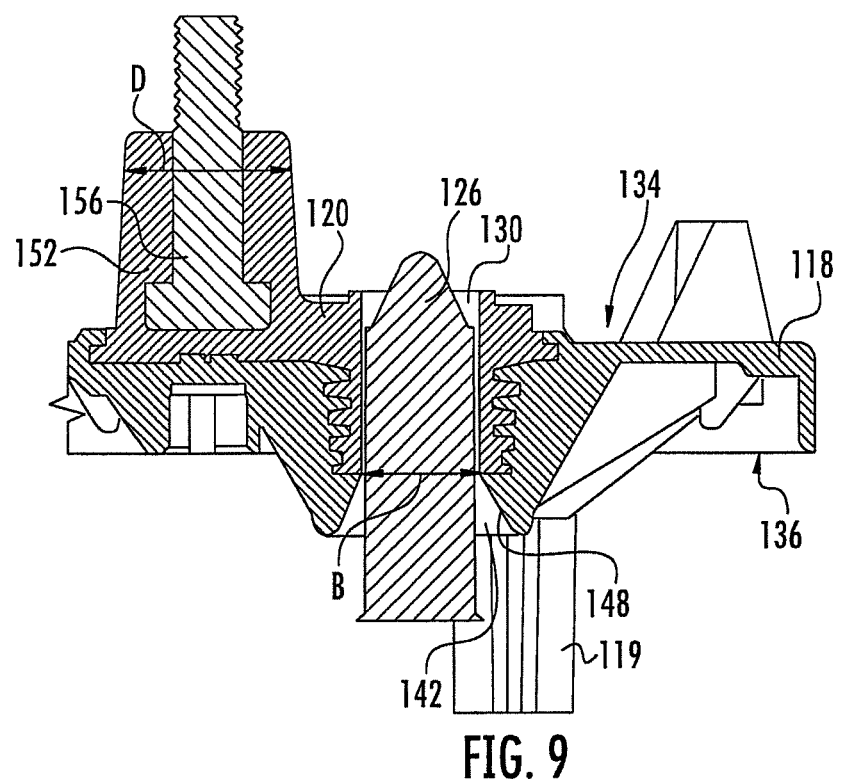
FIG. 9 is a cut-away cross-sectional view of a second bushing in the cover as shown in FIG. 4 with a second terminal post or a positive bushing and positive cast-on strap post provided therein according to one or more examples of embodiments.
Figure 10:
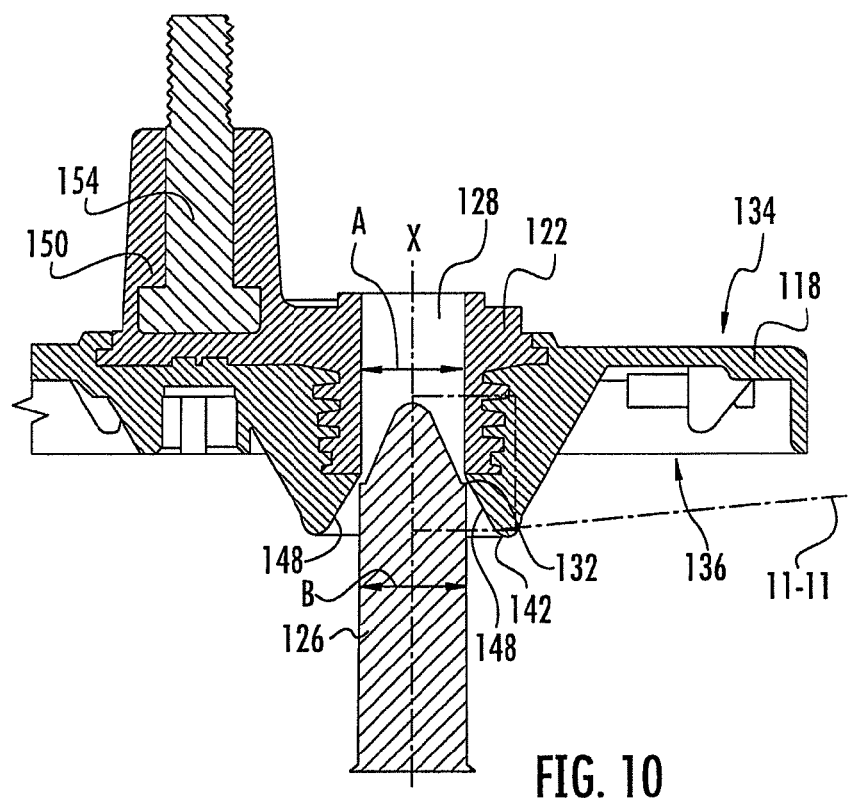
FIG. 10 is a cut-away cross-sectional view of the bushing in a cover shown in FIG. 8 with the second terminal post shown in FIG. 9 according to one or more examples of embodiments.
Figure 11:
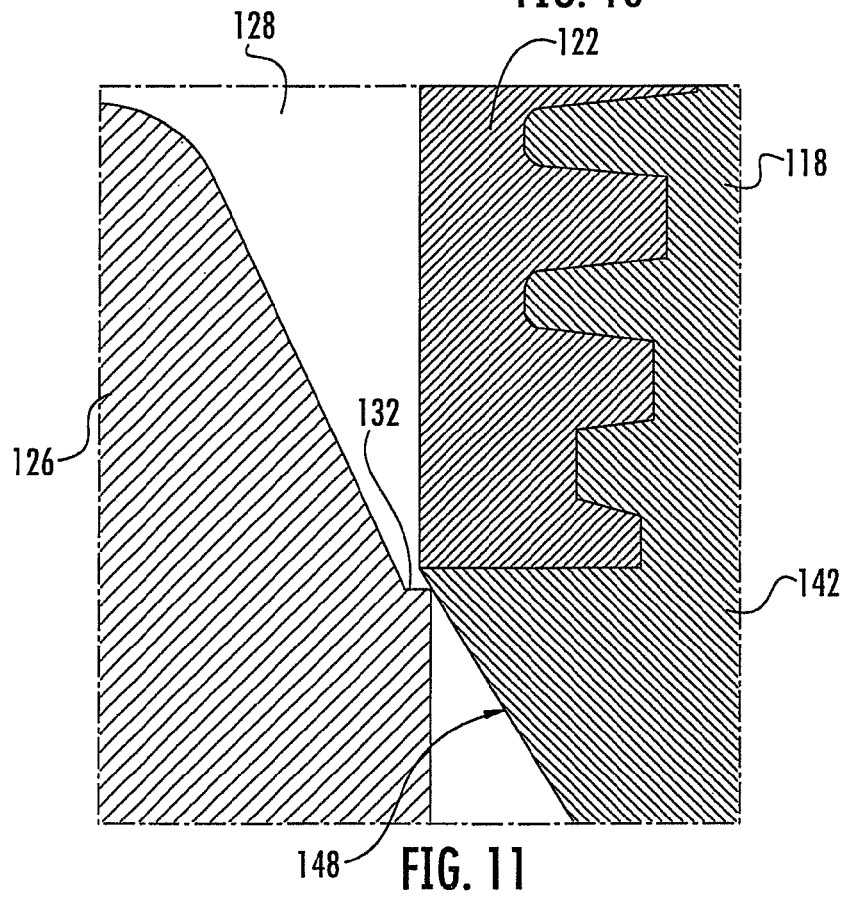
FIG. 11 is a cross-sectional view of the interface between the first bushing and second terminal post shown in FIG. 10, taken from line 11-11 of FIG. 10.

FIGS. 8 and 9 illustrate a positive bushing 120 and a negative bushing 122, respectively. As can be seen, a negative cast-on-strap post 124 fits properly within a negative bushing 122 (FIG. 8), and a positive cast-on-strap post 126 fits within a positive bushing 120 (FIG. 9). More specifically, the negative cast-on-strap post 124 has a diameter A which corresponds to a diameter A aperture 128 in the negative bushing 122. This aperture 128 is seated within the cover 118 of the battery 102 at one of the preformed receptors 146. The diameters A are precisely formed such that the cast-on-strap post 124 fits securely within the negative bushing 122 and forms an electrical contact or connection completed by a joining or melting operation. Similarly, the positive bushing 120 has a diameter B that corresponds with a diameter B of a positive cast-on-strap post 126. As a result, the positive cast-on-strap post 126 fits tightly within the aperture 130 in the positive bushing 120 and forms an electrical contact or connection completed by a joining or melting operation. The positive bushing 120, similar to the negative bushing, is seated in or above the receptor 146 on the cover 118. As can be seen in FIGS. 10 and 11, the cast-on-strap post, and in the illustrated figures the positive cast-on-strap post 126, may optionally include a shoulder 132 on an upper portion thereof.

The positive cast-on-strap post 126 has a diameter B which is greater than the diameter A of the negative bushing aperture 128. In the alternative, the shoulder 132 of the positive cast-on-strap post 126 may extend outwardly from the post a distance which is greater than the diameter of the negative bushing aperture 128. As a result, the positive cast-on-strap post 126 does not fit within or causes interference with or against the aperture 128 of the negative bushing 122. As can be specifically seen in FIG. 11, the positive cast-on-strap post 126 may intersect or interfere with the edge of negative bushing 122 so as to not allow the post 126 to pass through the bushing aperture 128. That is, a certain amount of interference with the bushing bottom at the point at which the cast-on-strap post connects or is to be inserted into the bushing may prevent further insertion of the post into the bushing. In addition, the aperture and/or post may be shaped such that the interference between the post and the outer walls of the aperture may increase as the post is forced into the aperture.

Similarly, the negative cast-on-strap post 124 may be provided with a dimension, or width, or shape, or diameter A that is smaller than the dimension, or width, or shape, or diameter B of the positive bushing aperture 130. As a result, the negative cast-on-strap post 124 does not form a tight fit, and thus does not form an electrical contact or connection, with the bushing 120.

While specific examples are described herein, it is understood that the features described respectively for the positive bushing 120, bushing aperture 130, and cast-on-strap post 126, and the negative bushing 122, bushing aperture 128 and cast-on-strap post 124 may be reversed to accomplish the same results and obtain the advantages associated therewith.

As indicated, the battery 102 includes at least a first terminal or post (e.g. a positive terminal post 138 or negative terminal or post 140) and a second terminal or post (e.g. a negative terminal post 140 or positive terminal or post 138). As shown in FIGS. 4-5, the first terminal post 138 and second terminal post 140 have different relative dimensions, sizes and/or shapes. For example, in various embodiments and as shown in FIGS. 4-5, and in particular FIGS. 8-9, the first terminal post 138 has an outside width, shape, and/or diameter C or dimension and the second terminal post has different width, shape, and/or outside diameter D or dimension. For example, in various embodiments, the outside diameter C of the first terminal or post 138 is less than or smaller than the outside diameter D of the second terminal or post 140. However, the converse arrangement is also acceptable for purposes of the present invention. The respective terminal post dimension C or D may be shaped and/or sized to correspond with a respective bushing diameter. While "diameter" is specifically described herein for purposes of example, any suitable width, shape, or geometric configuration or dimension that accomplishes the purposes provided may be acceptable.

In various embodiments, each bushing also may include a shoulder or subassembly adapted to help secure a terminal or terminal post 154 or 156 (e.g. a threaded terminal). For example, as can be seen in FIGS. 8-9, the shoulder 150 of the negative bushing 122 and the shoulder 152 of the positive bushing 120 may have different relative shapes, sizes and/or dimensions, such as but not limited to, different outside diameters or dimensions which correspond with a particular shape, size or dimension of terminal post or a portion of a particular terminal post.

Referring to FIGS. 12-25 the bushing 122, 120 and attached terminal 154, 156 may further be arranged and/or sized for proper connection of charging connectors or formation connectors. FIGS. 12-14 illustrate a proper alignment of a positive UTL bushing 120 with a positive current charging connector 158 and FIGS. 15-17 illustrate a proper alignment of a positive UTL bushing 120 shown with a universal connector 160. As can be seen in FIGS. 12 and 15, the positive charging connector 158 or universal connector 160 is arranged or seated over the terminal post 154. To properly form or charge the battery 102, the connector must be properly seated in contact with the bushing 120. As can be seen by reference to FIGS. 13-14 and 16-17, proper connection includes a physical contact between the connector 158, 160 and the terminal bushing 120 along facing side surfaces 162, 164 or 162, 166 thereof.

Figure 20:
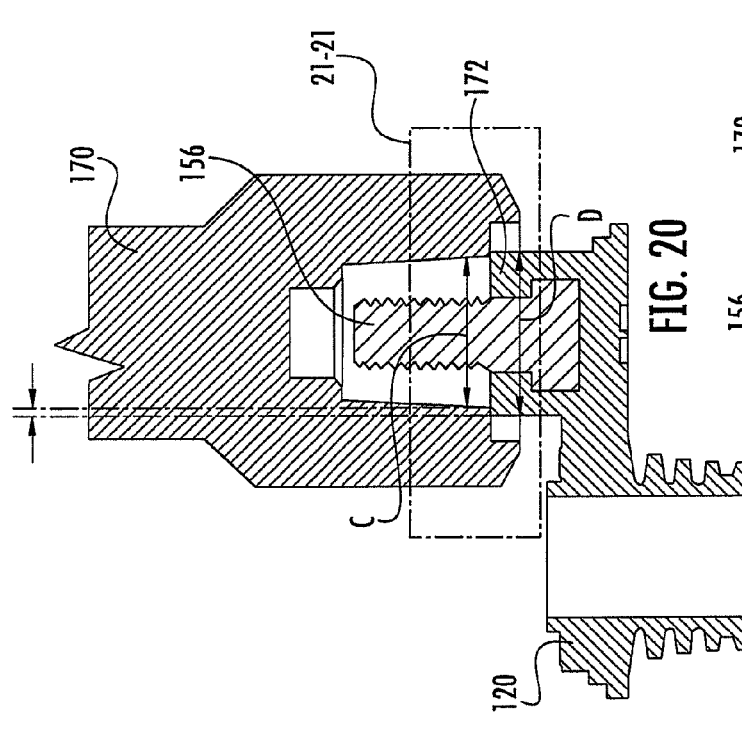
FIG. 20 is a cross-sectional view of a portion of a negative universal formation or charging connector provided on a positive bushing according to one or more examples of embodiments.
Figure 21:
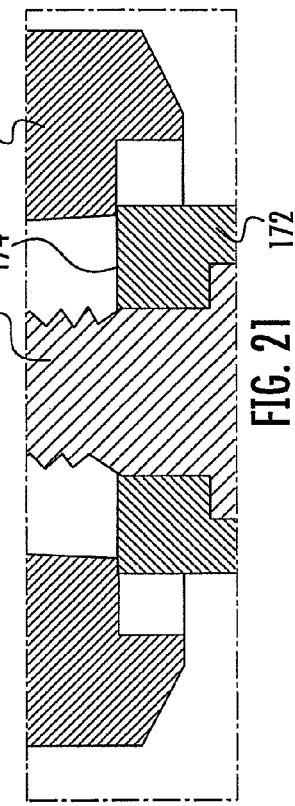
FIG. 21 is a cross-sectional view of the interface between the positive bushing and negative universal formation connector of FIG. 20, taken from line 21-21 of FIG. 20.
Figure 18:
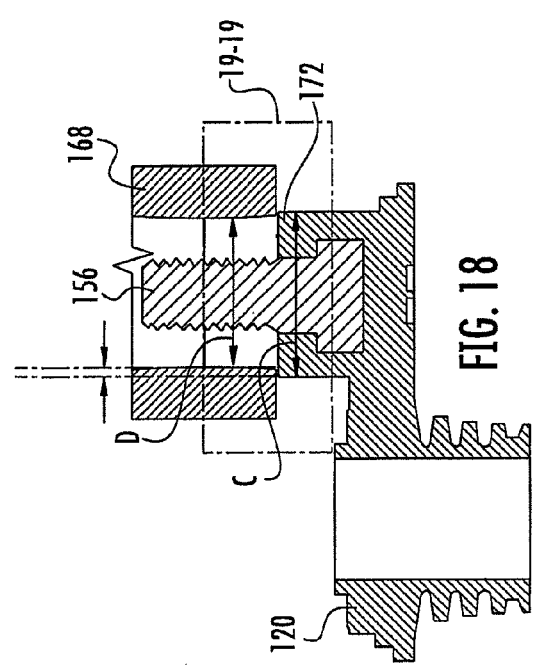
FIG. 18 is a cross-sectional view of a portion of a negative formation or charging connector provided on a positive bushing of FIG. 13 according to one or more examples of embodiments.
Figure 19:
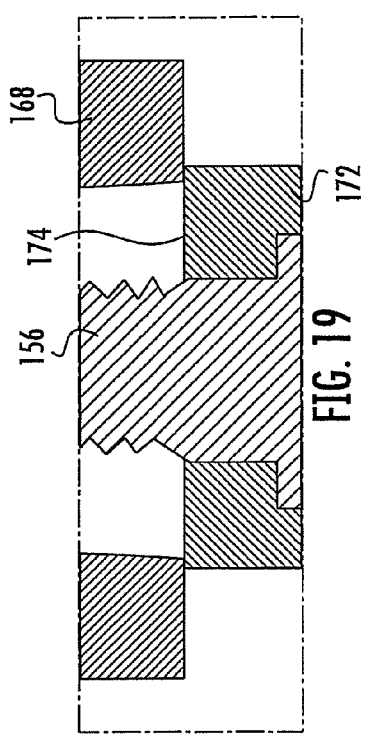
FIG. 19 is a cross-sectional view of the interface between the positive bushing and negative formation connector of FIG. 18, taken from line 19-19 of FIG. 18.

By comparison, FIGS. 18 and 19 show the positive UTL bushing 120, but with a negative charge connector 168 and FIGS. 20 and 21 show the corresponding negative universal connector 170 with the positive UTL bushing 120. As can be seen, in this case the positive bushing 120 has a post 172 with a dimension, or width, or shape, or diameter D that is greater than or different from the inner aperture 175 dimension, or diameter, or width, or shape C of the negative connector. As a result, the negative connector 168, 170 abuts against the top surface 174 of the post 172 and is unable to be seated and/or secured for charging or formation. Similarly, the negative bushing 122, illustrated in FIGS. 22 -25 includes a post 176 with smaller diameter C, dimension, or width, or varied shape than the inner aperture 177 of the positive charge connector or positive universal connector which has shape or dimension D. As a result, the positive connector 158, 160 does not contact the bushing or post on the facing surfaces 164, 166 and 178 of the connector 158, 160 and post 176 and would therefore not charge or supply a current or facilitate the transfer of a current. While a specific arrangement of bushing and connector is described for purposes of example, the converse arrangement (positive and negative with respect to the various dimensions, widths, shapes, sizes) is also acceptable.

In various examples of embodiments, a charging or formation cable includes first connector 158 or 160 at one end and a second connector 168 or 170 at the other end and the first connector and the second connector have different relative dimensions, sizes and/or shapes, such as described hereinabove. In addition to the example discussed above, the first connector 158 or 160 may define an inside dimension 175 adapted for coupling to a shoulder 172 or post of a first bushing 120 and the second connector 168 or 170 may define or include an inside dimension 177 adapted for coupling to a shoulder 176 or post of a second bushing 122. In various embodiments, the inside dimension 175 of the first connector is such that the first connector fits the outside diameter or dimension of the shoulder 172 of the first bushing and the inside dimension 177 of the second connector is such that the second connector fits the outside diameter or dimension of the shoulder 176 of the second bushing. The converse arrangement is also acceptable.

In addition to bushings and cast-on straps, the battery 102 has cell elements or chapters. Each cell element or chapter includes at least one positive plate 108, at least one negative plate 110, and a separator 112 provided between each positive and negative plate (see FIG. 3). Separators 112 are provided between the plates to prevent shorting and undesirable electron flow produced during the reaction occurring in the battery 102. Positive and negative electrode plates 110, 112 can be classified into various types according to the method of manufacturing the same (e.g. a paste type electrode). In various embodiments, a paste-type electrode includes a grid substrate and an electrochemically active material or "paste" provided on the substrate.

In various embodiments, the positive and negative plates 108, 110 each comprise or include a lead or lead alloy grid 116, 117 that supports an electrochemically active material 182 (see FIGS. 26-28). The grids 116, 117 provide an electrical contact between the positive and negative active materials or paste 182 which serves to conduct current. The grids 116, 117 also serve as a substrate for helping support electrochemically active material 182 (e.g., paste) deposited or otherwise provided thereon during manufacture. The grid may be formed of a soft alloy containing a trace of calcium for enhancing the mechanical strength of the substrate.

Known arts of lead acid battery grid making include: batch processes such as book mold gravity casting; and continuous processes such as strip expansion, strip stamping, continuous casting, and continuous casting followed by rolling. Grids made from these processes tend to have unique features characteristic of the particular process and behave differently in lead acid batteries, especially with respect to the pasting process. It should be appreciated that grids formed from any conventional or later-developed grid manufacturing process may be utilized, and it is not the intent to limit the invention to the grid design disclosed herein.

In various embodiments, at least some of the grids 116 are stamped grids. In various embodiments, as shown in FIG. 27, the stamped grid includes a frame 184 that includes a top frame element 186, first and second side frame elements 188, 190, and a bottom frame element 192. In various embodiments, the stamped grid 116 includes a series of grid wires 194 that define open areas 196 that help hold the active material or paste 182 that helps provides current generation. In various embodiments, a current collection lug 114 is integral with the top frame element 186. While the lug 114 may be offset from the center of the top frame element 186, the lug may alternatively be centered or positioned closer to either the first or second side frame elements 188 or 190. The top frame element 186 may include an enlarged conductive section at least a portion of which is directly beneath the lug to optimize current conduction to the lug 114.

The bottom frame element 192 may be formed with one or more downwardly extending feet (not shown) for spacing the remainder of the grid 116 away from the bottom of the battery container 104. In various embodiments, at least some of the wires 194 increase in cross-sectional area along their length from bottom to top or have a tapered shape so as to optimize the current carrying capacity of the wires to help carry away increasing current being generated from the bottom to the top. The width and spacing of the wires 194 between side elements 188, 190 may be predetermined so that there are substantially equal potential points across the width of the grid 116. To assist in supporting the electrochemical paste 182 and/or permit the formation of paste pellets, in various embodiments, the stamped grid 116 also includes horizontal wires 198 which are equally spaced apart and are parallel to the top and/or bottom frame elements 186, 192. However, at least some of the horizontal wires 198 may not be equally spread apart or parallel to the top and/or bottom frame elements 186, 192.

The cross-section of the grid wires may vary depending upon the grid making process. To help improve adhesion of the battery paste 182, however, in various embodiments, the grid wires 194 may be mechanically reshaped or refinished. It should be appreciated that any number of grid wire shapes may be utilized as long as the shape provides suitable paste adhesion characteristics. For example, the cross section of wires 194 may be of any cross-section design including substantially oval shaped, substantially rectangular, substantially diamond shape, substantially rhomboid shape, substantially hexagon shape, and/or substantially octagon shape. In the battery grid, each grid wire section may have a different cross-sectional configuration, or each grid wire section may have the same or a similar cross-sectional configuration. However, it is preferred that each grid wire section have the same cross-sectional configuration. Depending on the needs, a grid can be deformed at the vertical wire elements only, the horizontal wire elements only, or at both the vertical and horizontal wire elements.

Various stamped grid designs may be utilized. See, e.g., U.S. Pat. Nos. 5,582,936; 5,989,749; 6,203,948; 6,274,274; 6,921,611; 6,953,641; and 7,398,581 and U.S. patent application Ser. Nos. 11/086,525; 10/819,485; 11/984,666; 60/904,404; and 12/135,903, each of which are incorporated herein by reference in their entireties. It should be noted that an infinite number of grid designs may be utilized and therefore, it is not the intent of the following description to limit the invention to the grid designs discussed above, which are presented for the purposes of illustration.

The battery 102 may also include an expanded metal grid 117 (e.g., a grid for the negative plate 110). In various embodiments, the expanded metal grid 117 has a pattern (e.g., a diamond pattern), which is well known in the art, with a bottom frame element 200, and a top frame element 202 that is integral with a lug 115.

The active material or paste 182 is typically a lead-based material (e.g., PbO, $PbO_2$, Pb or $PbSO_4$ at different charge/discharge stages of the battery) that is pasted, deposited or otherwise provided onto the grids 116, 117. The paste composition may be determined by power requirements, cost and battery environment, as it is known in the art. In various embodiments, the active material of a lead-acid battery 102 is prepared by mixing lead oxide, sulfuric acid and water. The lead oxide reacts with the sulfuric acid to form mono-, tri- and/or tetrabasic lead sulfate(s). Dry additives, such as fiber and expander, may also be added to the active material. For example, in various embodiments, expanders such as finely-divided carbons (e.g., lampblack or carbon black), barium sulfate and various lignins may be included in the active material. In various embodiments, the mixture is then dried and water is re-added to form a paste of the desired consistency.

The active material 182 provided on the positive grid 116 (e.g., lead dioxide [$PbO_2$]), is typically in micro-particle form, so that the electrolyte is allowed to diffuse and permeate through the lead dioxide microparticles on the positive electrode plate 108. The spongy lead, the active material 182 of the negative electrode plate 110, is typically porous and reactive, so that the electrolyte is allowed to diffuse and permeate through the sponge lead on the negative electrode plate.

To prevent the separation of the active materials 182 from the grids 116, 117 and to ensure easy handling of the active materials in the manufacture of electrodes, a pasting paper (not shown) may be adhered or otherwise provided on at least one of the surfaces of the active material as a support to the active material after deposition on the grids. Porous nonwoven fabric (e.g., having micron-sized pores), instead of paper, may alternatively be provided into the surface or on the paste or active material to prevent the separation and handling problems of the active material and initial high rate discharge degradation. For example, a nonwoven fabric synthesized from thermoplastic resin by spun-bonding or thermal-bonding may be used. In various embodiments, nonwoven fabric formed of one or more polyesters, polypropylenes, or viscose rayon is used.

In various embodiments, one or more battery separators 112 (FIG. 3, 28) are used to conductively separate the positive and negative electrodes 108, 110. The separator material 112 is typically microporous to allow the through passage of ions from the positive and negative electrodes 108, 110. Separators for automotive batteries are typically made in continuous lengths and rolled, subsequently folded, and sealed along one or more of their edges to form pouches that receive a battery plate (e.g., a negative plate or a positive plate) (see FIG. 28). In various embodiments, separator material 112 generally has a substantially uniform thickness and a substantially uniform pore distribution. The pore distribution helps ensure an overall uniform current density during operation, thereby helping achieving a uniform charging and discharging of the electrodes and maximum battery efficiency. A separator 112 generally incorporates one or more ribs 204 to help stiffen the separator. The separator material may be constructed of a variety of materials (e.g., polyolefin, rubber, phenol-formaldehyde resorcinol, glass mat, microporous PVC, and sintered PVC). In various embodiments, the separator is comprised of a microporous sheet comprised of high molecular weight polyolefin. Examples of polyolefins that may be used include polyethylene, polypropylene, polybutene, ethylene-propylene copolymers, ethylene-butene copolymers, propylene-butene copolymers and ethylene- propylene-butene copolymers.

In various embodiments, the separator 112 is also constructed of an inert filler material. The filler can be soluble or insoluble in water. However, the filler may provide the primary means by which any plasticizer is absorbed and held in the composition and should not be soluble in the plasticizer. The preferred filler is dry, finely divided silica. However, other fillers (e.g., carbon black, coal dust, graphite, metal oxides and hydroxides, metal carbonates, minerals, zeolites, precipitated metal silicates, alumina silica gels, wood flour, wood fibers and bark products, glass particles, salts such as barium sulfate, inorganic salts, acetates, sulfates, phosphates, nitrates, carbonates and/or combinations thereof) may be utilized. It should also be understood that any known or later-developed wetting agents (e.g., sodium alkyl benzene sulfonate, sodium lauryl sulfate, dioctyl sodium sulfosuccinate, and isoctyl phenyl polyethoxy ethanol) may be utilized to enhance the wetability of the filler. In various embodiments, a separator 112 also includes at least one plasticizer. The plasticizer may be soluble or insoluble in water. Examples of plasticizers that may be used include organic esters, epoxy compounds, phosphate esters, hydrocarbon materials, and low molecular weight polymers. In various embodiments, the separator is comprised of a stabilizer or an antioxidant. In various embodiments, conventional stabilizers or antioxidants such as 4,4 thiobis(6-tert-butyl-m-cresol) ("Santonox"), and, 2,6-di-tert-butyl-4-methylphenol ("Ionol") may be utilized.

When the separator 112 is provided with one or more ribs 204, the ribs may be formed from a number of known or later-developed polymeric compositions (e.g., the same composition as the separator, other polyolefins, polyvinyl chloride, and/or filled or foamed compositions thereof). The ribs 204 may be provided in any number of ways. For example, the ribs may be formed by extrusion (either unitarily with the sheet or separately). The ribs 204 may also be formed by grooving or embossing. When ribs 204 are molded separately, they may be bonded or otherwise coupled to the sheet or base web by any number of methods known in the art including heat sealing or by an adhesive. While a particular rib configuration is disclosed herein, one skilled in the art will appreciate that any variety of rib configuration may be utilized depending at least in part on the grid design, plate design and/or battery 102.

The thickness of a separator 112 will vary depending upon the type of battery 102 in which it is used. In general, the thickness of the base web can range from 1 to 50 mils. For lead-acid batteries, the preferred thickness range is typically 10 to 40 mm. The height of each rib 204 may vary over a wide range depending upon plate spacing requirements. Generally, ribs from 5 to 200 mm in height from the base are provided, with the preferred range being 10 to 100 mm.

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A plate 108 or 110 for a lead-acid battery 102 is conventionally made by applying active material or paste 182 to a conductive support such as a lead alloy grid 116 or 117. Plates can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid with a diamond pattern. In various embodiments, the strip is coiled on a winder, and coils of lead alloy strip are stored for later use. In various embodiments, the strip may also be rolled. To form a battery grid, in various embodiments, the strip is fed through an expander that cuts, slits, and stretches a strip of coil to form the grids.

The grids 116, 117 may be produced using other known or later-developed processes. For example, as discussed above, the substrate may be formed by a casting process (e.g., by pouring a melted alloy into a mold), a stamping process, or by continuous rolling. During the manufacture of the grids or the plates, the grid wires may be refinished or reshaped (e.g., to improve adhesion of the paste).

The active material or paste 182 is then applied to or otherwise provided (e.g., pasted by a conventional paster) on the expanded strip or wire grid. In various embodiments, one or more pasting materials or pasting papers are provided on one or both surfaces of the active material. In various embodiments, the pasting materials or paper may be provided in a continuous process.

In various embodiments, the grids 116, 117, active material 182 and pasting material or paper are fed to a divider where the strip is cut into plates 108, 110. Plates cut from the strip may be flattened or otherwise modified to help smooth out any uneven regions of paste. In various embodiments, the plates 108, 110 pass (e.g., on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg C. (about 500 deg F.). After drying, the battery plates may undergo a chemical treatment, well known to those skilled in the art. The pasted plates are next typically cured for many hours under elevated temperature and humidity to help oxidize any free lead and otherwise adjust the crystal structure of the plate.

Conventional polyolefin battery separators 112 are typically produced by a process that comprises blending a composition of high molecular weight polyolefin, an inert filler material, and/or a plasticizer, forming the composition into sheet form, and subsequently extracting a portion of the inert filler and/or plasticizer from the sheet using a solvent.

After curing, the plates 108, 110 are assembled into batteries 102 (see FIG. 3). Groupings of individual battery plates may be assembled, enveloped, interleaved or otherwise separated with separator material, and provided together to form plate sets 106. For example, in one common battery design, every other plate (e.g., each negative plate) in the battery set is inserted into a battery separator in the form of an envelope. The envelope acts as a separator between the plate in the envelope and the adjoining plates in the battery set. The plate sets 106 are assembled in a container 104 to help form a battery 102.

During assembly, the positive lugs 114 of the battery plates 108 are coupled together and the negative lugs 115 of the battery plates 110 are coupled together. This is typically accomplished using cast-on straps 123 formed by taking assembled battery stacks, inverting them, and dipping the lugs into molten lead provided in a mold. Such cast-on-straps 123 may be uniquely formed depending on their use as a positive cast-on-strap or negative cast-on-strap. To this end, a mold may be provided with specific dimensions corresponding to the cast-on strap post (positive or negative). To permit current to follow throughout the battery 102, cast-on straps of stacks are joined or coupled. Moreover, cast-on strap terminal posts 124, 126 are provided which extend through bushings 122, 120 on the cover 118 to help permit electrical contact with a vehicle's electrical system or other system requiring or intended to use battery power.

Bushings 120, 122 are formed of suitable material, such as lead, and may be formed by mold or other conventional or future developed process. The mold may be formed to provide specific dimensions to the bushing as set forth herein so as to mate with a corresponding cast-on strap post. The bushings 120, 122 are inserted into the cover 118 in the respective predetermined locations (see FIG. 4).

The cover 118 is mounted on the battery housing 104. As outlined above, each bushing, terminal post, and/or the terminal is formed with a specific dimension, size, or shape for accurate assembly. As discussed hereinabove, in various embodiments, one or more components of the secondary battery 102 are dimensioned, sized and/or shaped to help prevent improper assembly and/or mis-formation of the secondary battery 102. In various embodiments, one or more terminals 138, 140, posts 124, 126 and 154, 156, bushings 120, 122, bushing apertures 128, 130, and cover 118 are distinctly shaped, dimensioned or sized. In particular, the design provides specific sized, shaped, or dimensioned component which mates with a corresponding component. Further, the particular component is specifically placed on the cover 118 for accurate assembly of the cover on the battery. The unique design of any such components, or combination(s) of components, provides for proper and accurate assembly of the secondary battery 102 by requiring specific placement of the cover 118, which includes a positive bushing 120 and a negative bushing 122 on opposite sides of longitudinal centerline 142 and opposite sides of transverse centerline 144, on correspondingly positioned positive cast-on strap post 126 and negative cast-on strap post 124. In addition, if an operator attempts to reverse the position of the cover 118, the cover will not attach, due to the interference caused by the differing shaped, sized or dimensioned post 124 or 126 and bushing aperture 128 or 130.

In various embodiments, the battery housing 104, including the cover 118, is provided containing the battery cells. In various embodiments, the battery housing 104 is submerged in acidic electrolyte fluid or other methods used to fill the battery housing 104 with electrolyte fluid through the fill tube holes in the battery cover 118. After filling the battery housing 104 with electrolyte fluid, the battery 102 is removed from the electrolyte fluid. Any residual electrolyte fluid coating, dust, and other debris may be washed away to prepare the battery 102 for shipment. Before washing the battery housing external surfaces, the fill tube holes may be plugged to prevent washing fluid from entering the battery housing 104.

Following the initial wash, the batteries are electrochemically formed by passage of current to convert the lead sulfate or basic lead sulfate(s) to lead dioxide (positive plates) or lead (negative plates). This is referred to as the "formation" process. As outlined above, the formation process may utilize one or more formation cables (not shown). One or more formation cables may include one or more connectors 158 or 160, 168 or 170 that couple together with battery terminals 172, 176 for formation. In various embodiments, each bushing or terminal of the battery 102 is adapted or otherwise formed and each connector of the formation cable is adapted or otherwise formed to correspond to a particularly dimensioned, sized or shaped bushing or terminal to help encourage that the formation cable be coupled to the battery 102 according to one or more desired orientations. For example, the terminals 138, 140, posts 172, 176 (or 124, 126, 154, 156), bushings 120, 122 and formation connectors 158, 160, and 168, 170, with formation connector apertures 175, 177 are distinctly shaped, dimensioned or sized. In particular, the design provides a specific sized, shaped or dimensioned component that mates with a corresponding formation connector. As a result, the lead-acid battery 102 is property attached to formation connectors and cables, and therefore properly charged or formed during the formation process. An operator is unable to incorrectly or improperly attach formation cables to terminals, thereby discouraging improper assembly and/or mis-formation and damage of the secondary battery.

A battery according to the foregoing embodiments has several advantages over existing devices. For instance, at least one cast-on strap post is adapted to help guide the positioning of the cover on the battery. Similarly, a robust bushing design is provided in which at least one bushing is adapted to help guide the positioning of the cover on the battery. The foregoing helps encourage or requires that the cover be placed or provided in one or more desired orientations of the battery, resulting in better fitment generally, and helps avoid battery failure or damage due to improper assembly. In some examples of embodiments, at least two battery terminals of different relative dimensions, shapes and/or sizes are provided; and/or at least two battery terminal posts of different relative dimensions (e.g. outside diameters), shapes and/or sizes; and/or at least two bushings of different relative dimensions (e.g. inside diameters), shapes and/or sizes. The foregoing arrangements help encourage or require that the cover be placed or provided in one or more desired orientations, may result in better fitment generally and to help avoid battery failure or damage due to improper assembly. In addition, the battery according to the foregoing includes at least one bushing or terminal or post adapted to couple to a corresponding charged formation connector. For example, at least one bushing or bushing post is sized differently relative to another bushing to fit a particularly sized, dimensioned, and/or shaped formation cable connector. In various embodiments, the relative different dimensions of the shoulders of the first bushing and the second bushing and the formation connectors helps encourage proper formation and helps prevent mis-formation of batteries. As a result, the battery is properly formed. The arrangement also discourages or prevents mis-formation, and leads to better formation connector fitment generally.

According to the embodiments described herein, providing relatively uniquely sized (e.g. differently sized, shaped or dimensioned) terminal posts, cast-on strap posts, and/or bushings helps ensure that one or more battery components are not incorrectly assembled. For example, the relatively different terminal post outside diameters and the relatively different bushing inside diameters may help ensure that further components (e.g., the cover) cannot be easily provided on, formed on and/or coupled to the battery housing in an undesirable or less optimal manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the battery or electrodes as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

What is claimed is:

1. A battery cover adapted for correct assembly on a battery housing comprising an outer surface having a longitudinal centerline and a transverse centerline perpendicular to the longitudinal centerline, a first bushing having an aperture with a first circumference that mates with a corresponding first circumference of a positive cast-on-strap post and a second bushing having a second circumference that mates with a corresponding second circumference of a negative cast-on-strap post, the second circumference being different from the first circumference, and the first bushing and second bushing being carried by the cover and positioned on opposite sides of the longitudinal and transverse centerlines.

2. The battery cover of claim 1, wherein the first bushing has a first post extending above the outer surface of the cover and has an outer first dimension that mates with a positive formation charging connector, and the second bushing has a second post extending above the outer surface of the cover and has an outer second dimension that mates with a negative charging formation connector, the outer second dimension being different from the outer first dimension.

3. The battery cover of claim 1, wherein the aperture of the first bushing has a bottom portion having a second circumference which is larger than the first circumference.

4. The battery cover of claim 1, wherein the positive cast-on-strap post and bushing aperture each have a diameter which is greater than a diameter of the negative cast-on-strap post and second bushing aperture.

5. A secondary battery comprising a battery cover having a first bushing and a second bushing, the first bushing and second bushing being positioned on opposite sides of an intersecting longitudinal centerline and transverse centerline, and having apertures having differing circumferences which match respective positive and negative cast-on-strap posts having differing circumferences.

6. The secondary battery of claim 5, wherein the first bushing has a first post extending above an outer surface of the battery cover and has an outer first dimension that mates with a positive formation charging connector, and the second bushing has a second post extending above the outer surface of the battery cover and has an outer second dimension that mates with a negative charging formation connector.

7. The secondary battery of claim 5, wherein the positive cast-on-strap post includes a shoulder on an upper portion and a tapered tip portion, the shoulder portion having a circumference that is larger than the tip portion of the positive cast-on-strap post.

8. The secondary battery of claim 5, wherein the positive cast-on-strap post and bushing aperture each have a circumference which is greater than a circumference of the negative cast-on-strap post and second bushing aperture.

9. The secondary battery of claim 5, wherein one of the positive cast-on-strap post or negative cast-on-strap post interferes with a bushing having opposite polarity so as to prevent passage of the post through the opposite polarity bushing aperture.

10. The secondary battery of claim 5, wherein one of the positive cast-on-strap post or negative cast-on-strap post of the cover is smaller than an aperture of a bushing having opposite polarity so as to not form an electrical connection.

11. A vehicle including the secondary battery of claim 5.

12. A secondary battery including the battery cover of claim 1.

13. The battery cover of claim 1, wherein one of the positive cast-on-strap post or negative cast-on-strap post is smaller than an aperture of a bushing having opposite polarity so as to not form an electrical connection.

14. The secondary battery of claim 12, wherein one of the positive cast-on-strap post or negative cast-on-strap post interferes with a bushing having opposite polarity so as to prevent passage of the post through the opposite polarity bushing aperture.

15. The secondary battery of claim 12, wherein the positive cast-on-strap post includes a shoulder on an upper portion and a tapered tip portion, the shoulder portion having a circumference that is larger than the tip portion of the positive cast-on-strap post.

16. The assembly of claim 15, further comprising a cast-on strap post having a first circumference, a shoulder, and a tip, the shoulder having a circumference equal to the first circumference of the cast-on-strap past and the circumference of the cast-on-strap post decreasing from the shoulder to the tip; wherein the cast-on-strap post is adapted to fit in the aperture of the second bushing but not the aperture of the first bushing.

17. An assembly for a secondary battery comprising:
a cover having an outer surface with a longitudinal centerline and transverse centerline perpendicular to the longitudinal centerline;
a first bushing provided on the cover having an aperture, the aperture having a top with a first circumference and a bottom having a second circumference;
a second bushing having a circumference which differs from the first circumference provided on the cover on the opposite side of the longitudinal and transverse centerlines from the first bushing.

* * * * *